United States Patent
Perry et al.

(10) Patent No.: US 12,516,984 B2
(45) Date of Patent: Jan. 6, 2026

(54) INFRARED SENSORS

(71) Applicant: The Boeing Company, Arlington, VA (US)

(72) Inventors: Lori Perry, O'Fallon, MO (US); Marty McConnell, Creve Coeur, MO (US); Chad Keller, Calverton Park, MO (US); Kyle Robertson, Maryland Heights, MO (US); Jeffery Murphy, Troy, MO (US)

(73) Assignee: The Boeing Company, Arlington, VA (US)

( * ) Notice: Subject to any disclaimer, the term of this patent is extended or adjusted under 35 U.S.C. 154(b) by 195 days.

(21) Appl. No.: 18/368,998

(22) Filed: Sep. 15, 2023

(65) Prior Publication Data

US 2025/0093206 A1    Mar. 20, 2025

(51) Int. Cl.
*G01J 5/061*    (2022.01)
*G01J 5/04*    (2006.01)
*G01J 5/10*    (2006.01)

(52) U.S. Cl.
CPC .................. *G01J 5/061* (2013.01); *G01J 5/04* (2013.01); *G01J 5/10* (2013.01); *G01J 2005/106* (2013.01)

(58) Field of Classification Search
None
See application file for complete search history.

(56) References Cited

U.S. PATENT DOCUMENTS

| | | | |
|---|---|---|---|
| 2005/0029453 A1* | 2/2005 | Allen | H04N 25/76 250/332 |
| 2005/0235652 A1 | 10/2005 | Iwasaki | |
| 2011/0083446 A1* | 4/2011 | Pinet | F25B 21/02 62/3.6 |

OTHER PUBLICATIONS

Extended European Search Report for European Application No. EP241961333 dated Feb. 6, 2025, 9 pages.

* cited by examiner

*Primary Examiner* — Hoon K Song
(74) *Attorney, Agent, or Firm* — Harrity & Harrity, LLP

(57) ABSTRACT

A system includes a sensor housing and a sensor processor external to the sensor housing. The sensor housing includes an infrared detection module and a thermoelectric module proximate to the infrared detection module. The infrared detection module is configured to detect infrared radiation of a scene and generate a measurement associated with the infrared radiation. The thermoelectric module is configured to provide thermal control to the infrared detection module based on a modulated power signal. An accuracy of the measurement is based on the thermal control provided to the infrared detection module. The sensor processor is configured to transmit a power signal to the infrared detection module and transmit a direct current power signal to the thermoelectric module. The direct current power signal is based on the modulated power signal.

20 Claims, 5 Drawing Sheets

INFRARED SENSORS

FIELD

The present disclosure generally relates to sensors, and more particularly, to infrared sensors for measuring infrared radiation in, but not limited to, extreme, dynamic temperature environments.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Aircrafts can install infrared sensors to detect infrared radiation. As non-limiting examples, an aircraft can use an infrared sensor to determine crop health, ocean temperature, and other climate related measurements. Because aircrafts typically fly in various environmental conditions, it can be difficult for an infrared sensor to accurately measure radiometric properties. For example, as the ambient temperature increases or decreases as an aircraft descends or ascends, a radiometric calibration of the infrared sensor can become unstable. As a result, the infrared sensor may not be able to accurately measure subtle changes in sea surface temperatures that can affect ocean life that are sensitive to small temperature changes.

SUMMARY

The present application is directed to improving infrared radiance measurement accuracy. According to the present application, an infrared detection module and a thermoelectric module are included in a relatively small sensor housing for use at remote sensing locations or in labs, factories, aircrafts, etc. In some implementations, the infrared detection module is a focal plane array. The thermoelectric module is proximate to the infrared detection module within the sensor housing such that the thermoelectric module can provide a heating effect or a cooling effect to the infrared detection module. For example, the thermoelectric module can act as a variable-resistant load that can provide electrical heating or cooling to the infrared detection module based on a proximity of the variable-resistant load to the infrared detection module. The infrared detection module can include a temperature monitor that is configured to monitor a temperature of the infrared detection module and generate a corresponding temperature reading. The temperature reading can be transmitted to a sensor processor associated with the infrared sensor through a communication port, such as RS-485. To reduce the size of the sensor housing, instead of locating the sensor processor within the sensor housing, the sensor processor can be located a fair distance from the sensor housing. As a non-limiting example, the sensor processor can be located in a sensor processor housing that is external to the sensor housing.

Based on the temperature reading, the sensor processor can determine whether (or how) to adjust the temperature of the infrared detection module. For example, the sensor processor can determine whether to increase the temperature of the infrared detection module, decrease the temperature of the infrared detection module, or maintain the temperature of the infrared detection module at the current temperature. The sensor processor can adjust the temperature of the infrared detection module by generating a pulse-width modulated power signal and filtering it to provide direct current power to the thermoelectric module that is proximate to the infrared detection module. For example, to decrease the temperature of the infrared detection module, the sensor processor can generate a pulse-width modulated signal having a first polarity such that when the direct current power signal is provided to the thermoelectric module, the thermoelectric module provides a cooling effect to the infrared detection module. Alternatively, to increase the temperature of the infrared detection module, the sensor processor can generate a pulse-width modulated power signal having a second polarity such that when the direct current power signal is provided to the thermoelectric module, the thermoelectric module provides a heating effect to the infrared detection module. The magnitude at which the thermoelectric module cools or heats the infrared detection module is based on the ratio of the pulse-width to the pulse repeat interval of the pulse-width modulated power signal, which when filtered, provides a direct current voltage at the same ratio to the maximum available voltage.

Calibration (e.g., radiometric calibration) of the infrared sensor can be substantially maintained by maintaining the temperature of the infrared detection module at a designated target temperature. Thus, using the feedback associated with the temperature reading described above, the sensor processor can generate pulse-width modulated power signals such that, when the direct current power signals are provided to the thermoelectric module, the thermoelectric modules provides electrical heating and cooling to the infrared detection module to maintain the temperature of the infrared detection module at the designated temperature. Thus, when the infrared detection module is in low temperature environments, the techniques described herein can be used to provide thermal control to the infrared detection module such that the temperature of the infrared detection module is maintained near the target temperature. As a result, the radiometric calibration of the infrared sensor is stabilized and the infrared sensor can generate accurate readings.

In one aspect, the present application discloses a system. The system includes a sensor housing and a sensor processor external to the sensor housing. The sensor housing includes an infrared detection module and a thermoelectric module proximate to the infrared detection module. The infrared detection module is configured to detect infrared radiation of a scene and generate a measurement associated with the infrared radiation of the scene. The thermoelectric module is configured to provide thermal control to the infrared detection module based on a modulated power signal. An accuracy of the measurement is based on the thermal control provided to the infrared detection module. The sensor processor is configured to transmit a power signal to the infrared detection module and transmit a direct current power signal to the thermoelectric module. The direct current power signal is based on the modulated power signal.

In another aspect, the present application discloses a method. The method includes detecting, by an infrared detection module, infrared radiation of a scene. The method also includes generating, by the infrared detection module, a measurement associated with the infrared radiation of the scene. The method also includes providing, by a thermoelectric module proximate to the infrared detection module, thermal control to the infrared detection module based on a modulated power signal. An accuracy of the measurement is based on the thermal control provided to the infrared detection module. A sensor housing includes the thermoelectric module and the infrared detection module. A sensor processor, external to the sensor housing, transmits a power signal to the infrared detection module and transmits a direct current power signal to the thermoelectric module. The direct current power signal is based on the modulated power signal.

In still another aspect, a non-transitory computer-readable medium having stored thereon instructions is disclosed. The instructions, when executed by a sensor processor external to a sensor housing, cause the sensor processor to perform operations. The operations include transmitting a power signal to an infrared detection module within the sensor housing. The power signal causes the infrared detection module to detect infrared radiation of a scene and generate a measurement associated with the infrared radiation of the scene. The operations also include transmitting a direct current power signal to a thermoelectric module within the sensor housing. The direct current power signal causes the thermoelectric module to provide thermal control to the infrared detection module. An accuracy of the measurement is based on the thermal control provided to the infrared detection module. The thermoelectric module is proximate to the infrared detection module.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
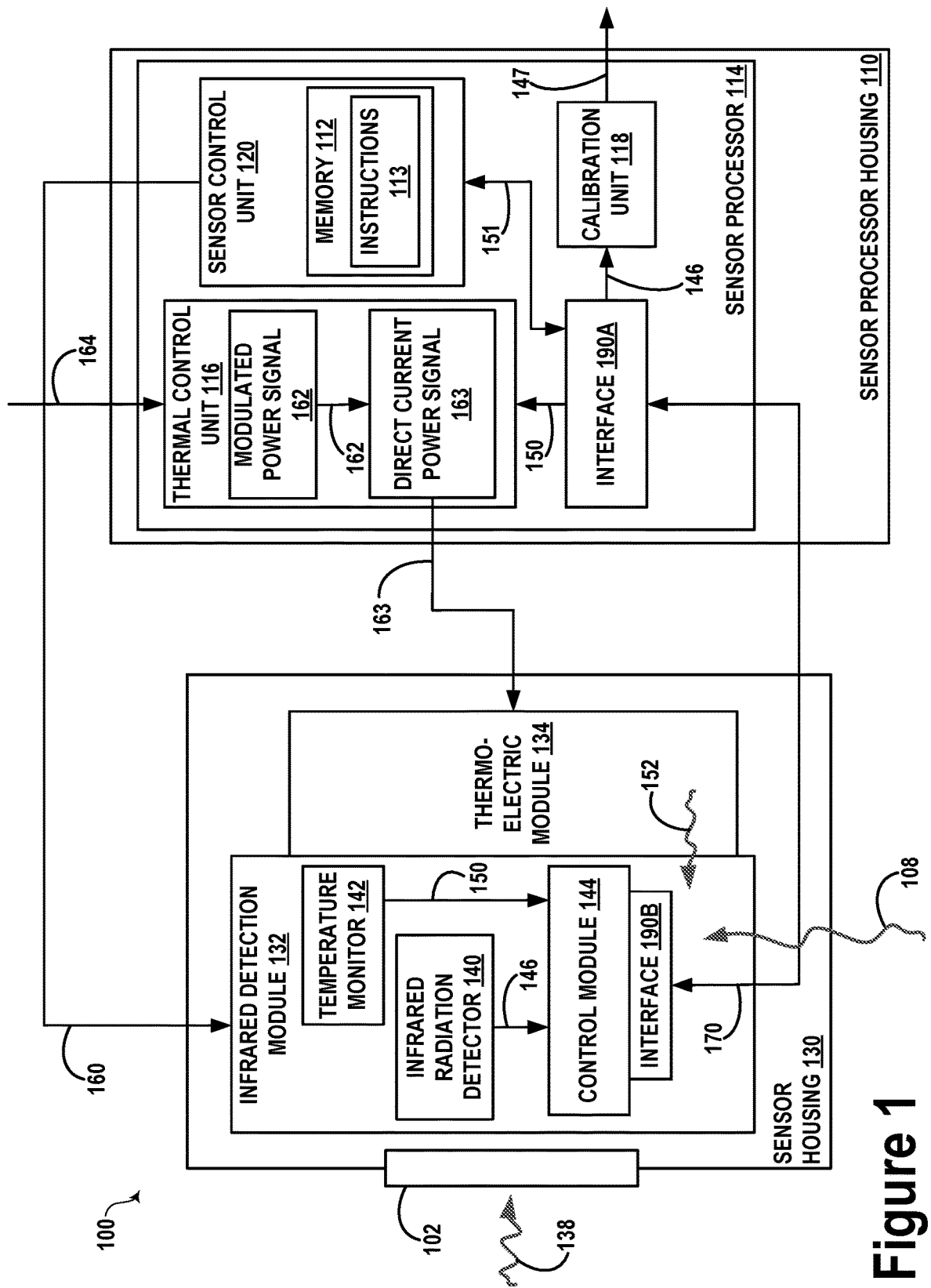
FIG. 1 illustrates a system that is operable to provide thermal control to an infrared detection module associated with an infrared sensor, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, interfaces are illustrated and associated with reference number 190. When referring to a particular one of the interfaces, such as the interface 190A, the distinguishing letter "A" is used. However, when referring to any arbitrary one of the interfaces or to the interfaces as a group, the reference number 190 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, a system 100 that is operable to provide thermal control to an infrared detection module associated with an infrared sensor is illustrated, in accordance with an exemplary embodiment. The system 100 includes a sensor processor housing 110 and a sensor housing 130. According to one implementation, the sensor processor housing 110 is located in an aircraft interior, such as an interior region or cabin of the aircraft 400 of FIG. 4. According to one implementation, the sensor housing 130 is located on an aircraft exterior, such as proximate an exterior surface of the aircraft 400 of FIG. 4.

The sensor processor housing 110 includes a sensor processor 114. The sensor housing 130 includes an infrared detection module 132 and a thermoelectric module 134 that is proximate to the infrared detection module 132. In some implementations, a thermal path between the thermoelectric module 134 and the infrared detection module 132 can be comprised of a thermally conductive alloy structure. An outer polymer of the thermal path can provide insulation.

The infrared detection module 132 includes an infrared radiation detector 140, a temperature monitor 142, and a control module 144. The components within the sensor housing 130 can be configured to communicate with the sensor processor 114 using one or more cables. According to one implementation, a single cable can be used to facilitate data communication between the sensor processor 114 and the infrared detection module 132. For example, a single cable can be coupled to an interface 190A of the sensor processor 114 and to an interface 190B of the infrared detection module 132. Using the single cable and the interfaces 190, data can be transferred from the infrared detection module 132 to the sensor processor 114, and data can be transferred from the sensor processor 114 to the infrared detection module 132. According to one implementation, the communication port corresponds to RS-485.

The sensor processor 114 includes a thermal control unit 116, a calibration unit 118, and a sensor control unit 120. The sensor control unit 120 includes a memory 112. The memory 112 can correspond to a non-transitory computer-readable medium that includes instructions 113 that are executable by the sensor control unit 120 to perform the operations disclosed herein. For example, the sensor control unit 120 can be configured to transmit a power signal 160 (e.g., a direct current power signal) to the infrared detection module 132 to provide power to the infrared detection module 132. Data and commands 151 can be exchanged between the sensor control unit 120 and the interface 190A.

In response to receiving the power signal 160, the infrared detection module 132 can be configured to detect infrared radiation 138 of a scene. For example, if the sensor housing 130 is installed on an aircraft 400, the infrared detection module 132 can detect the infrared radiation 138 of a scene surrounding the aircraft 400 when the aircraft 400 is in flight. To illustrate, in FIG. 1, the infrared radiation detector 140 can detect the infrared radiation 138 of the scene. For example, the sensor housing 130 can include a small window 102 that enables the infrared radiation detector 140 to detect the infrared radiation 138 of the scene. In some implementations, the infrared radiation detector 140 (or the infrared detection module 132) corresponds to a focal plane array that detects the infrared radiation 138.

The infrared detection module 132 can also be configured to generate a measurement 146 (e.g., radiometric values) associated with infrared radiation 138. For example, the infrared radiation detector 140 can generate the measurement 146 (e.g., a raw measurement) associated with the infrared radiation 138. The measurement 146 is provided to the control module 144 and is transmitted to the sensor processor 114 as part of a signal 170. For example, using the interface 190B, the control module 144 transmits the measurement 146 to the sensor processor 114 as part of the signal 170. When the signal 170 is received by the interface 190A of the sensor processor 114, the measurement 146 is provided to the calibration unit 118. The calibration unit 118 can calibrate the measurement 146 to generate an infrared radiance measurement 147 that is provided to a host system.

In some scenarios, the temperature of the infrared detection module 132 can change based on environmental temperature effects 108. An accuracy of the measurement 146 can be based on a temperature of the infrared detection module 132. For example, to generate relatively accurate measurements 146, the temperature of the infrared detection module 132 should be maintained at a particular temperature. As a non-limiting example, the particular temperature can correspond to twenty-five (25) degrees Celsius. As another non-limiting example, the measurement 146 can be relatively accurate if the particular temperature of the infrared detection module 132 is within a relatively small range of temperatures. It should be understood that the temperatures and/or temperature ranges are merely for illustrative purposes and should not be construed as limiting. In other embodiments, the infrared detection module 132 can be calibrated such that the measurements 146 are relatively accurate at other temperatures and/or temperature ranges.

To ensure that the temperature of the infrared detection module 132 is maintained at a level that enables the infrared detection module 132 to generate accurate measurements 146 for the infrared radiation 138, based on the temperature of the infrared detection module 132, direct current power signals 163 can be provided to the thermoelectric module 134 to provide thermal control 152 within the sensor housing 130. To illustrate, the temperature monitor 142 can be configured to monitor the temperature of the infrared detection module 132 and generate a temperature reading 150 that is indicative of the temperature. The temperature reading 150 is provided to the control module 144 and is transmitted to the sensor processor 114 as part of the signal 170. For example, using the interface 190B, the control module 144 transmits the temperature reading 150 to the sensor processor 114 as part of the signal 170. When the signal 170 is received by the interface 190A of the sensor processor 114, the temperature reading 150 is provided to the thermal control unit 116.

In response to receiving the temperature reading 150, the thermal control unit 116 can be configured to generate a modulated power signal 162 that is filtered into a direct current power signal 163. As described below, a polarity of the modulated power signal 162 can be used to provide thermal control 152 (e.g., a cooling effect or a heating effect) to the thermoelectric module 134. Thus, if the temperature reading 150 indicates that the temperature of the infrared detection module 132 is too hot (e.g., greater than a target temperature 164), the thermal control unit 116 can generate a modulated power signal 162 having a first polarity. As described below, the thermoelectric module 134 can provide the cooling effect as the thermal control 152 in response to receiving the direct current power signal 163 based on the modulated power signal 162 having the first polarity. Alternatively, if the temperature reading 150 indicates that the temperature of the infrared detection module 132 is too cold (e.g., less than the target temperature 164), the thermal control unit 116 can generate a modulated power signal 162 having a second polarity. As described below, the thermoelectric module 134 can provide the heating effect as the thermal control 152 in response to receiving the direct current power signal 163 based on the modulated power signal 162 having the second polarity. The magnitude at which the thermoelectric module 134 cools or heats the infrared detection module 132 is based on the pulse-width modulated power signal 162 and filter, and thus the magnitude of the direct current power signal 163. The thermal control unit 116 can be configured to transmit the direct current power signal 163 to the thermoelectric module 134.

The thermoelectric module 134 can be configured to receive the direct current power signal 163 and provide thermal control 152 to the infrared detection module 132 based on the direct current power signal 163. For example, in some implementations, the thermoelectric module 134 acts as a variable-resistant load that provides the cooling effect or the heating effect based on the polarity of the modulated power signal 162. According to one implementation, to provide the thermal control 152 to the infrared detection module 132, the thermoelectric module 134 can be configured to provide the cooling effect to the infrared detection module 132 in response to the modulated power signal 162 having the first polarity. According to another implementation, to provide the thermal control 152 to the infrared detection module 132, the thermoelectric module 134 can be configured to provide the heating effect to the infrared detection module 132 in response to the modulated power signal 162 having the second polarity. Thus, to provide the thermal control 152 to the infrared detection module 132, the thermoelectric module 134 can be configured to provide the heating effect or the cooling effect to the infrared detection module 132 to maintain a particular temperature of the infrared detection module 132. As described above, one non-limiting example of the particular temperature is twenty-five (25) degrees Celsius.

The system 100 of FIG. 1 improves calibration of the infrared detection module 132 by maintaining the temperature of the infrared detection module 132 at a target temperature (e.g., twenty-five (25) degrees Celsius). For example, based on the temperature reading 150 from the infrared detection module 132, the sensor processor 114 can generate the direct current power signal 163 and provide the direct current power signal 163 to the thermoelectric module 134. Based on the polarity of the modulated power signal 162 filtered to generate a magnitude of the direct current power signal 163, the thermoelectric module 134 can provide heating or cooling to the infrared detection module 132 to maintain the temperature of the infrared detection module 132 at the target temperature 164. As a result, a calibration metric associated with the infrared detection module 132 is stabilized based on the thermal control 152 provided to the infrared detection module 132 via the thermoelectric module 134.

The sensor processor 114 can continue to receive temperature readings 150 from the infrared detection module 132 and provide direct current power signals 163 (based on the temperature readings 150) to the thermoelectric module 134 to temperature control the infrared detection module 132.

Figure 2:
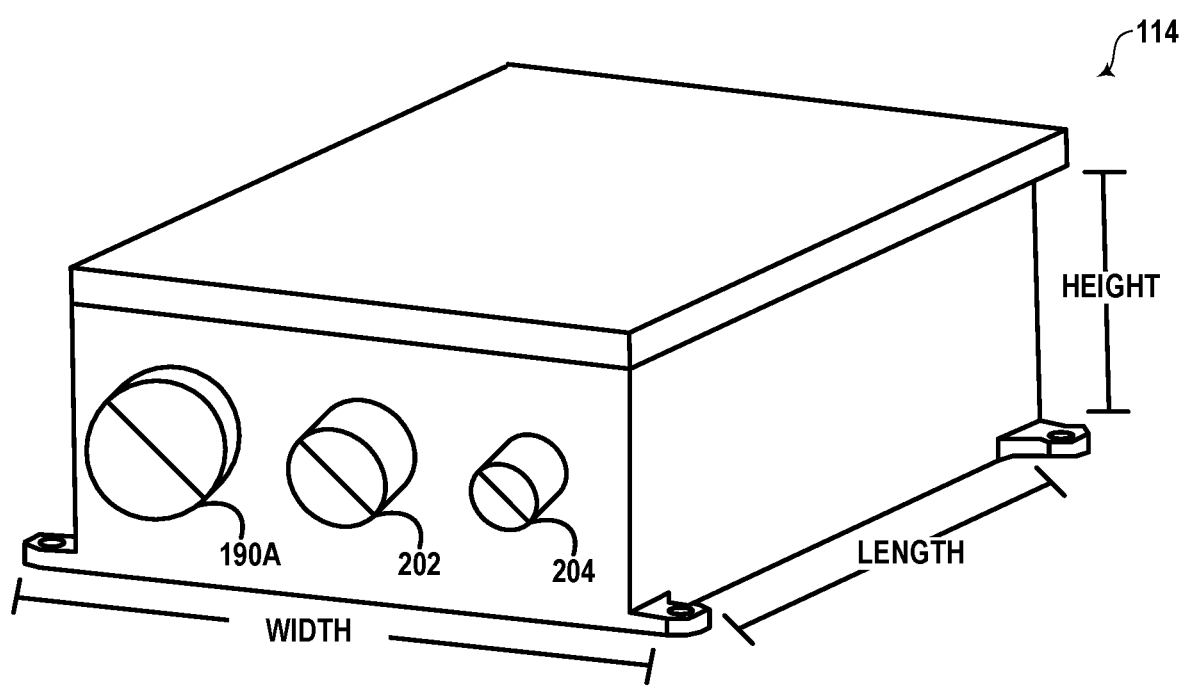
FIG. 2 illustrates a sensor processor, according to an exemplary embodiment.

Referring to FIG. 2, the sensor processor 114 is illustrated, in accordance with an exemplary embodiment. As described above, the sensor processor 114 is separated from the infrared detection module 132, which in turn, enables the sensor housing 130 to have a relatively small size.

The sensor processor 114 can be relatively small in size. According to one implementation, the sensor processor 114 can have a width of approximately five and one-half (5.5) inches, a length of approximately seven and one-half (7.5) inches, and a height of approximately three (3) inches. It should be understood that the above dimensions are merely for illustrative purposes and should not be construed as limiting. In other implementations, the sensor processor 114 can have alternative dimensions and/or shapes. According to one implementation, the sensor processor 114 can be relatively light in weight. As a non-limiting example, the sensor processor 114 can weigh less than four (4) pounds.

As illustrated in FIG. 2, the sensor processor 114 can include a plurality of interfaces. For example, the sensor processor 114 can include the interface 190A (e.g., the RS-485 port), an Ethernet port 202, and a power port 204. As described with respect to FIG. 1, the interface 190A can be used to facilitate data transmission between the sensor processor 114 and the infrared detection module 132.

The Ethernet port 202 can enable the sensor processor 114 to communicate with the host system. For example, the Ethernet port 202 can be used to facilitate data transmission between the host system and the sensor processor 114 via an Ethernet cable. The power port 204 can enable the sensor processor 114 to receive power. According to one implementation, a power cable can be coupled to the power port 204 and to a host system such that the sensor processor 114 receives power from the host system. According to another implementation, the power cable can be coupled to the power port 204 and to another power source such that the sensor processor 114 receives power from another power source.

The sensor processor 114 depicted in FIG. 2 enables greater flexibility for the infrared detection module 132. For example, by separating the sensor processor 114 from the sensor housing 130 (e.g., separating the sensor processor 114 from the infrared detection module 132), the sensor housing 130 can have a relatively small size, which enables the infrared detection module 132 to fit in more locations, as further depicted in FIG. 4.

Figure 3:
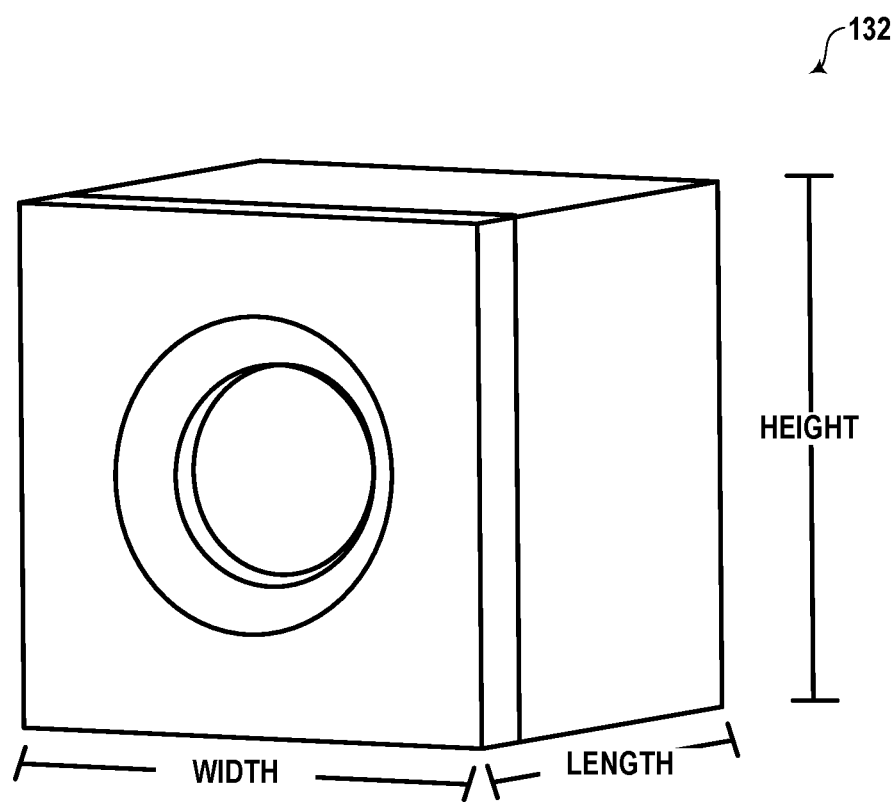
FIG. 3 illustrate an infrared sensor, according to an exemplary embodiment.

Referring to FIG. 3, the infrared detection module 132 is illustrated, in accordance with an exemplary embodiment. As described above, the infrared detection module 132 is separated from the sensor processor 114, which in turn, enables the sensor housing 130 to have a relatively small size.

The infrared detection module 132 can be relatively small in size. According to one implementation, the infrared detection module 132 can have a width of approximately one and seven-tenths (1.7) inches, a length of approximately one and seven-tenths (1.7) inches, and a height of approximately one and fifth-five-hundredths (1.55) inches. It should be understood that the above dimensions are merely for illustrative purposes and should not be construed as limiting. In other implementations, the infrared detection module 132 can have alternative dimensions and/or shapes. According to one implementation, the infrared detection module 132 can be relatively light in weight. As a non-limiting example, the infrared detection module 132 can weigh approximately one-half (0.5) pounds.

As described above, the thermoelectric module 134 can provide electrical heating and cooling to the infrared detection module 132. The infrared detection module 132 measurement can undergo radiometric calibration. As described with respect to FIG. 1, a measurement associated with the infrared detection module 132 is stabilized based on the thermal control 152 provided to the infrared detection module 132 via the thermoelectric module 134.

Figure 4:
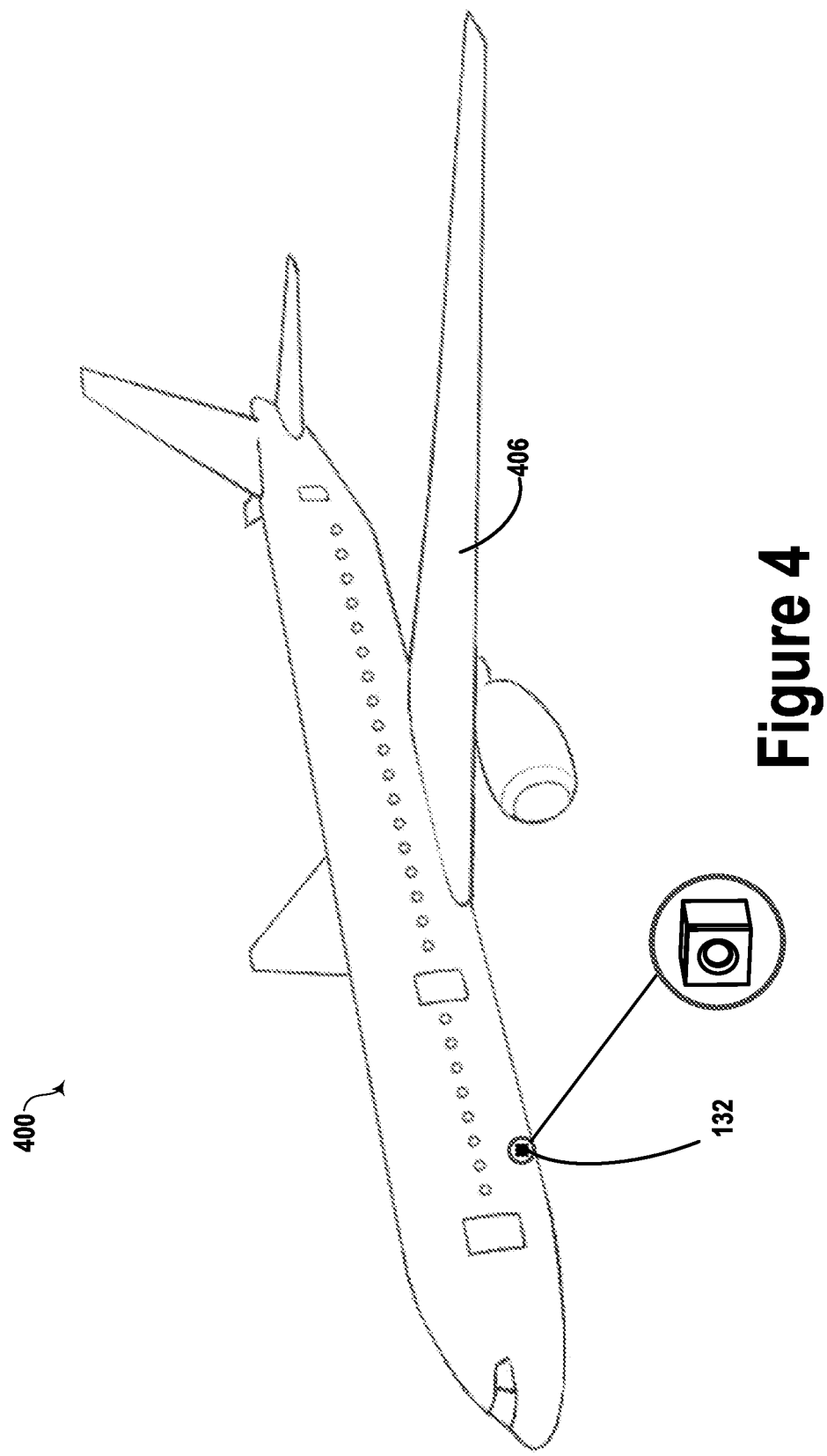
FIG. 4 illustrates an aircraft, according to an exemplary embodiment.

Referring to FIG. 4, an aircraft 400 is illustrated, in accordance with an exemplary embodiment. Among other things, the aircraft 400 includes external components and an outer mold line 406. As illustrated in FIG. 4, the infrared detection module 132 and an associated sensor housing, such as the sensor housing 130, can be coupled to external components or to the outer mold line 406 of the aircraft 400, such as the belly of the aircraft 400.

Figure 5:
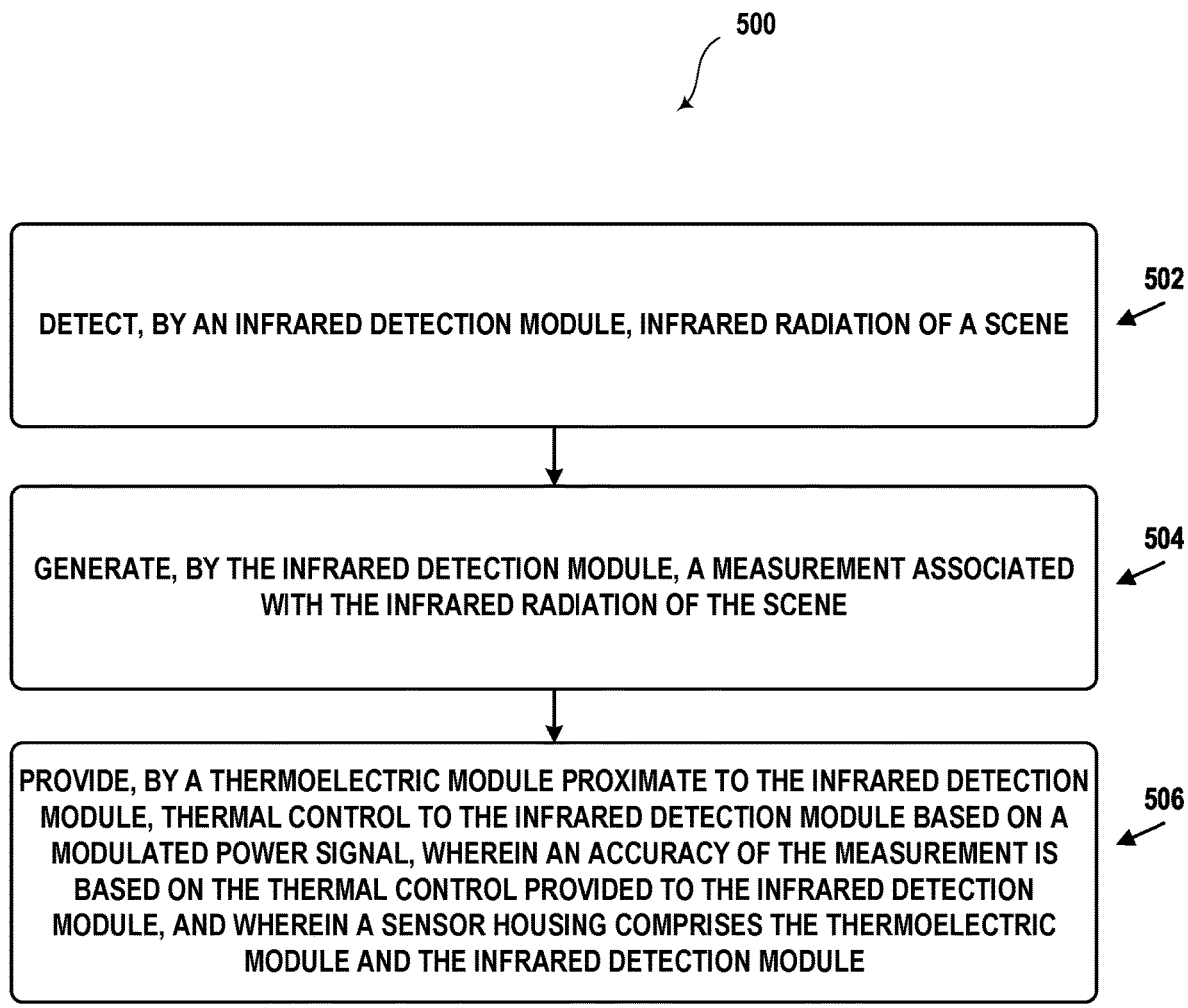
FIG. 5 is a flowchart of an example of an implementation of a method, according to an exemplary embodiment.

FIG. 5 illustrates a flow chart of a method 500, according to an exemplary embodiment. The method 500 can be performed by the system 100 of FIG. 1.

The method 500 includes detecting, by an infrared detection module, infrared radiation of a scene, at block 502. For example, referring to FIG. 1, the infrared detection module 132 detects infrared radiation 138 of a scene.

The method 500 includes generating, by the infrared detection module, a measurement associated with the infrared radiation of the scene, at block 504. For example, referring to FIG. 1, the infrared detection module 132 generates the measurement 146 associated with the infrared radiation 138 of the scene.

The method 500 also includes providing, by a thermoelectric module proximate to the infrared detection module, thermal control to the infrared detection module based on a filtered modulated power signal, at block 506. An accuracy of the measurement is based on the thermal control provided to the infrared detection module. The sensor housing includes the thermoelectric module and the infrared detection module. For example, referring to FIG. 1, the thermoelectric module 134 provides thermal control 152 to the infrared detection module 132 based on the modulated power signal 162 used to generate the direct current power signal 163. An accuracy of the measurement 146 is based on the thermal control 152 provided to the infrared detection module 132. The sensor housing 130 includes the thermoelectric module 134 and the infrared detection module 132.

In the method 500, a sensor processor, external to the housing, transmits a power signal to the infrared detection module and transmits a direct current power signal to the thermoelectric module. The direct current power signal is based on the modulated power signal. For example, referring to FIG. 1, the sensor processor 114, external to the sensor housing 130, transmits the power signal 160 to the infrared detection module 132 and transmits the direct current power signal 163 (based on the modulated power signal 162) to the thermoelectric module 134.

According to one implementation, the method 500 includes monitoring, by a temperature monitor of the infrared detection module, a temperature of the infrared detection module. For example, referring to FIG. 1, the temperature monitor 142 monitors the temperature 148 of the infrared detection module 132. The method 500 can also include transmitting, by the temperature monitor, a temperature reading to the sensor processor. The temperature reading is indicative of the temperature of the infrared detection module. For example, referring to FIG. 1, the temperature monitor 142 transmits the temperature reading 150 to the sensor processor 114. The temperature reading 150 is indicative of the temperature 148 of the infrared detection module 132. The sensor processor 114 generates the modulated power signal 162 based, at least in part, on the temperature reading 150.

According to one implementation of the method 500, providing the thermal control 152 to the infrared detection module 132 includes providing a cooling effect to the infrared detection module 132 in response to the modulated power signal 162 having a first polarity. According to one implementation of the method 500, providing the thermal control 152 to the infrared detection module 132 includes providing a heating effect to the infrared detection module 132 in response to the modulated power signal 162 having a second polarity. According to one implementation of the method 500, providing the thermal control 152 to the infrared detection module 132 includes providing a heating effect or a cooling effect to the infrared detection module 132 to maintain a particular temperature of the infrared detection module 132. As a non-limiting example, the particular temperature correspond to twenty-five (25) degrees Celsius.

The method 500 of FIG. 5 improves calibration of the infrared detection module 132 measurement by maintaining the temperature of the infrared detection module 132 at a target temperature (e.g., twenty-five (25) degrees Celsius). For example, based on the temperature reading 150 from the infrared detection module 132, the sensor processor 114 can generate the direct current power signal 163 (e.g., a filtered version of the modulated power signal 162) and provide the direct current power signal 163 to the thermoelectric module 134. Based on the polarity and magnitude of the direct current power signal 163, the thermoelectric module 134 can provide heating or cooling to the infrared detection module 132 to maintain the temperature of the infrared detection module 132 at the target temperature. As a result, a measurement associated with the infrared detection module 132 is stabilized based on the thermal control 152 provided to the infrared detection module 132 via the thermoelectric module 134.

Although the systems are described herein with specific reference to aerospace vehicles, in other embodiments, the system can be a vehicle other than an aircraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A system comprising:
    a sensor housing comprising:
        an infrared detection module configured to:
            detect infrared radiation of a scene; and
            generate a measurement associated with the infrared radiation of the scene; and
        a thermoelectric module proximate to the infrared detection module,
            wherein the thermoelectric module configured to provide thermal control to the infrared detection module based on a modulated power signal and a monitored temperature of the infrared detection module,
            wherein the thermoelectric module is configured to provide a cooling effect to the infrared detection module based on a first polarity of the modulated power signal,
            wherein the thermoelectric module is configured to provide a heating effect to the infrared detection module based on a second polarity of the modulated power signal,
            wherein a magnitude at which the thermoelectric module cools or heats the infrared detection module is based on a direct current power signal,
            wherein the direct current power signal is based on the modulated power signal, and
            wherein an accuracy of the measurement is based on the thermal control provided to the infrared detection module; and
    a sensor processor external to the sensor housing, the sensor processor configured to:
        transmit a power signal to the infrared detection module; and
        transmit the direct current power signal to the thermoelectric module.

2. The system of claim 1,
    wherein the infrared detection module comprises a temperature monitor that is configured to:
        monitor the temperature of the infrared detection module; and
        transmit a temperature reading to the sensor processor, wherein the temperature reading is indicative of the temperature of the infrared detection module,
            wherein the sensor processor is configured to generate the modulated power signal based, at least in part, on the temperature reading.

3. The system of claim 1, wherein, to provide the thermal control to the infrared detection module, the thermoelectric module is configured to provide the heating effect and the cooling effect to the infrared detection module to maintain a particular temperature of the infrared detection module.

4. The system of claim 1, wherein the thermoelectric module acts as a variable-resistant load.

5. The system of claim 1, further comprising a cable to facilitate data communication between the sensor processor and the infrared detection module.

6. The system of claim 1, wherein the infrared detection module includes a focal plane array.

7. The system of claim 1, wherein the sensor processor is configured to communicate with a host system.

8. The system of claim 1, wherein the modulated signal is a pulse-width modulated power signal.

9. The system of claim 1, wherein the magnitude is based on a ratio of a pulse-width to a pulse repeat interval of the modulated signal.

10. A method comprising:
    detecting, by an infrared detection module, infrared radiation of a scene;
    generating, by the infrared detection module, a measurement associated with the infrared radiation of the scene; and
    providing, by a thermoelectric module proximate to the infrared detection module, thermal control to the infrared detection module based on a modulated power signal and a monitored temperature of the infrared detection module,
        wherein the thermoelectric module is configured to provide a cooling effect to the infrared detection module based on a first polarity of the modulated power signal,
        wherein the thermoelectric module is configured to provide a heating effect to the infrared detection module based on a second polarity of the modulated power signal,
        wherein a magnitude at which the thermoelectric module cools or heats the infrared detection module is based on a direct current power signal,
        wherein the direct current power signal is based on the modulated power signal,
        wherein an accuracy of the measurement is based on the thermal control provided to the infrared detection module,
        wherein a sensor housing comprises the thermoelectric module and the infrared detection module, and
        wherein a sensor processor, external to the sensor housing, transmits a power signal to the infrared detection module and transmits the direct current power signal to the thermoelectric module.

11. The method of claim 10, further comprising:
    monitoring, by a temperature monitor of the infrared detection module, the temperature of the infrared detection module; and
    transmitting, by the temperature monitor, a temperature reading to the sensor processor, wherein the temperature reading is indicative of the temperature of the infrared detection module,
        wherein the sensor processor generates the modulated power signal based, at least in part, on the temperature reading.

12. The method of claim 10, wherein providing the thermal control to the infrared detection module comprises providing the heating effect and the cooling effect to the infrared detection module to maintain a particular temperature of the infrared detection module.

13. The method of claim 10, wherein the thermoelectric module acts as a variable-resistant load.

14. The method of claim 10, wherein the infrared detection module includes a focal plane array.

15. The method of claim 10, wherein the modulated signal is a pulse-width modulated power signal.

16. The method of claim 10, wherein the magnitude is based on a ratio of a pulse-width to a pulse repeat interval of the modulated signal.

17. A non-transitory computer-readable medium comprising instructions that, when executed by a sensor processor external to a sensor housing, cause the sensor processor to perform operations comprising:
   transmitting a power signal to an infrared detection module within the sensor housing, the power signal causing the infrared detection module to:
     detect infrared radiation of a scene; and
     generate a measurement associated with the infrared radiation of the scene; and
   transmitting a direct current power signal to a thermoelectric module within the sensor housing,
     wherein the direct current power signal causes the thermoelectric module to provide thermal control to the infrared detection module,
     wherein the thermoelectric module is configured to provide a cooling effect to the infrared detection module based on a first polarity of a modulated power signal,
     wherein the thermoelectric module is configured to provide a heating effect to the infrared detection module based on a second polarity of the modulated power signal,
     wherein a magnitude at which the thermoelectric module cools or heats the infrared detection module is based on a direct current power signal,
     wherein the direct current power signal is based on the modulated power signal,
     wherein an accuracy of the measurement is based on the thermal control provided to the infrared detection module, and
     wherein the thermoelectric module is proximate to the infrared detection module.

18. The non-transitory computer-readable medium of claim 17, wherein the thermoelectric module acts as a variable-resistant load.

19. The non-transitory computer-readable medium of claim 17, wherein the infrared detection module includes a focal plane array.

20. The non-transitory computer-readable medium of claim 17, wherein providing the thermal control to the infrared detection module comprises providing the heating effect and the cooling effect to the infrared detection module to maintain a particular temperature of the infrared detection module.

\* \* \* \* \*